United States Patent
Wakabayashi et al.

(10) Patent No.: US 7,391,336 B2
(45) Date of Patent: Jun. 24, 2008

(54) ANOMALY MONITORING SYSTEM FOR MOLDING MACHINE

(75) Inventors: Eiki Wakabayashi, Nagano-ken (JP); Kazunaga Suzuki, Nagano-ken (JP)

(73) Assignee: Nissei Plastic Industrial Co., Ltd., Nagano-Ken (JP)

(*) Notice: Subject to any disclaimer, the term of this patent is extended or adjusted under 35 U.S.C. 154(b) by 536 days.

(21) Appl. No.: 11/092,581

(22) Filed: Mar. 29, 2005

(65) Prior Publication Data
US 2005/0220918 A1  Oct. 6, 2005

(30) Foreign Application Priority Data
Mar. 30, 2004  (JP) .............................. 2004-101082

(51) Int. Cl.
- B29C 29/00 (2006.01)
- B29C 35/08 (2006.01)
- B29C 35/12 (2006.01)
- B28B 17/00 (2006.01)
- B29B 13/00 (2006.01)

(52) U.S. Cl. .................. 340/679; 425/136; 700/197
(58) Field of Classification Search ................. 340/679; 425/135–150; 700/200–204
See application file for complete search history.

(56) References Cited

U.S. PATENT DOCUMENTS

| | | | |
|---|---|---|---|
| 5,301,120 A * | 4/1994 | Magario ...................... 700/201 |
| 5,995,009 A * | 11/1999 | Yonezawa et al. ........... 340/635 |
| 6,275,741 B1 * | 8/2001 | Choi ........................... 700/200 |
| 6,311,101 B1 * | 10/2001 | Kastner ....................... 700/197 |
| 6,529,796 B1 * | 3/2003 | Kroeger et al. .............. 700/202 |
| 6,904,333 B2 * | 6/2005 | Morimura .................... 700/197 |
| 6,961,641 B1 * | 11/2005 | Forth et al. .................. 700/295 |
| 6,980,882 B2 * | 12/2005 | Yamazaki et al. ........... 700/200 |
| 7,013,196 B2 * | 3/2006 | Magario et al. ............. 700/204 |
| 7,066,725 B2 * | 6/2006 | Zufle .......................... 425/135 |
| 2002/0031567 A1 * | 3/2002 | Magario ..................... 425/135 |
| 2003/0139176 A1 * | 7/2003 | Fujiwara et al. ............. 455/420 |
| 2004/0114194 A1 * | 6/2004 | Eguchi et al. ............... 358/400 |

FOREIGN PATENT DOCUMENTS

JP  2002-86531 A  3/2002
JP  2002-370271 A  12/2002

* cited by examiner

Primary Examiner—Benjamin C. Lee
Assistant Examiner—Jennifer Mehmood
(74) Attorney, Agent, or Firm—Birch, Stewart, Kolasch & Birch, LLP

(57) ABSTRACT

Each of molding machines has a conductive line whose electrification state changes as a result of anomalous stoppage. An anomaly monitoring system includes detection sections provided in the conductive lines so as to detect the electrification states thereof; a data processing section having input ports to which the detection sections are connected, wherein, when a detection signal indicating the electrification state of a conductive line is provided from a detection section to an input port, the data processing section outputs data regarding a mail address and a message prepared in accordance with the input port having received the detection signal and the electrification state; and a mail transmission section which receives the data output from the data processing section and sends an electronic mail containing the message to a communication terminal corresponding to the mail address.

20 Claims, 6 Drawing Sheets

FIG.4

| INPUT PORT | CONTACT | MESSAGE | MAIL ADDRESS | STOPPAGE | RESUMPTION | RETRANSMISSION |
|---|---|---|---|---|---|---|
| P1 | Ⓐ | (STOPPAGE) Me1 | Ad1 | . | | |
| | | | Ad2 | . | | |
| | | | Ad3 | . | . | |
| | | | Ad4 | . | | |
| | | | Ad5 | . | | |
| | B | (RESUMPTION) Me2 | Ad1 | . | . | . |
| | | | Ad2 | . | . | . |
| | | (RETRANSMISSION) Me3 | Ad3 | . | . | |
| | | | Ad4 | | | |
| | | | Ad5 | | | |
| P2 | Ⓐ | (STOPPAGE) Me1 | Ad1 | . | . | |
| | | | Ad2 | . | . | |
| | | | Ad3 | . | . | |
| | | | Ad4 | . | . | |
| | | | Ad5 | . | . | |
| | B | (RESUMPTION) Me2 | Ad1 | . | . | . |
| | | (RETRANSMISSION) Me3 | Ad2 | . | . | . |
| | | | Ad3 | | | |
| | | | Ad4 | | | |
| | | | Ad5 | | | |
| P3 | Ⓐ | (STOPPAGE) Me1 | Ad1 | . | . | |
| | | | Ad2 | . | . | |
| | | | Ad3 | . | . | |
| | | | Ad4 | . | . | |
| | | | Ad5 | . | . | |
| | B | (RESUMPTION) Me2 | Ad1 | . | . | |
| | | (RETRANSMISSION) Me3 | Ad2 | . | . | |
| | | | Ad3 | | | |
| | | | Ad4 | | | |

ANOMALY MONITORING SYSTEM FOR MOLDING MACHINE

BACKGROUND OF THE INVENTION

1. Field of the Invention

The present invention relates to an anomaly monitoring system for a molding machine which detects an anomalous stoppage of the molding machine during continuous operation, and transmits a detection report to a communication terminal at a different location via communication means.

2. Description of the Relevant Art

Generally, in an automated molding plant in which an injection molding machine is operated continuously, monitoring anomalous stop of the injection molding machine is an important task for securing productivity to thereby fulfill a production plan. Therefore, in the case where a night operation or a 24-hour continuous operation is performed without a supervisor, when the injection molding machine anomalously stops, a step necessary for resumption of operation cannot be taken, with resultant fatal problems such as failure to fulfill the production plan. Meanwhile, in the case where a supervisor always monitors the injection molding machine, the supervisor must work at nights or on holidays, which poses a big problem for, in particular, a small-scale automated molding plant which has difficulty in employing shift workers.

Therefore, conventionally, there have been proposed a monitoring, management, and control system for a molding machine (Japanese Patent Application Laid-Open (kokai) No. 2002-86531) and an anomaly monitoring apparatus for an injection molding machine (Japanese Patent Application Laid-Open (kokai) No. 2002-370271), which are designed to enable remote anomaly monitoring. The former monitoring, management, and control system includes an injection molding machine, peripheral equipment, various detectors, a process controller, and a host computer. The host computer has a communication section which communicates with a cellular phone at an outside, remote location via the Internet to which the host computer is connected. With this configuration, the host computer exchanges various data with the cellular phone; and monitors, manages, and controls the injection molding machine in accordance with instructions from the cellular phone, to thereby continue the operation of the injection molding machine. The latter monitoring apparatus is designed to send an electronic mail from an electronic mail transmission section when an anomaly detector detects occurrence of an anomaly in any of injection molding machines, to thereby inform a supervisor of occurrence of an anomaly.

However, the conventional monitoring system and apparatus for monitoring anomaly of molding machines have the following problems to be solved.

First, since a computer system or a monitoring apparatus equivalent thereto is interposed between a molding machine and mail transmission means (communication means), there is a merit such that various types of processing can be performed by use of the computer; however, the hardware configuration of the entire system becomes too complex in an effort to satisfy a user's need of knowing minimum necessary information at a remote location, whereby cost and size increase to an unignorable degree.

Second, since the communication section of a monitoring apparatus (monitoring system) and the communication section of each molding machine are mutually connected via a communication line and monitoring is performed, by means of computer processing or active processing, by a method in which the operation state of each injection molding machine is obtained at anomaly detection intervals of, for example, 5 minutes, the control method becomes complex, and cost increases to an unignorable degree because of software cost.

Third, since the molding machine must have necessary functional sections such as a communication section, the monitoring apparatus (monitoring system) cannot be attached directly to an old-type injection molding machine or the like which does not have a communication section. Therefore, the conventional monitoring apparatus (monitoring system) encounters difficulties in relation to attachment and general application to various molding machines.

SUMMARY OF THE INVENTION

An object of the present invention is to provide an anomaly monitoring system for a molding machine, which system enables a supervisor to acquire information which specifies a molding machine having stopped because of anomaly, which is minimum necessary information that the supervisor wishes to acquire, at a remote location and by means of a communication terminal such as a cellular phone, and which system realizes such information provision by use of a considerably simple hardware configuration and therefore can be fabricated at low cost and in a compact size.

Another object of the present invention is to provide an anomaly monitoring system for a molding machine, which system eliminates necessity of mutually connecting the communication section of a monitoring apparatus (monitoring system) and the communication section of each molding machine, and eliminates necessity of performing monitoring through computer processing or active processing, to thereby simplify the control method, and enable easy and low-cost implementation from the viewpoint of software.

In order to achieve the above-described objects, the present invention provides an anomaly monitoring system for a molding machine, which system detects that at least a molding machine in continuous operation stops because of anomaly and transmits a detection report to a communication terminal at a remote location by means of communication means. The system comprises at least one detection section which is provided in a conductive line of at least one molding machine, the state of electrification of the conductive line changing as a result of anomalous stoppage of the molding machine and the detection section detecting the electrification state of the conductive line; a data processing section having at least one input port to which the detection section is connected, wherein, when a detection signal indicating the electrification state of the conductive line is provided from the detection section, the data processing section outputs data regarding a mail address and a message prepared in accordance with the input port having received the detection signal and the electrification state; and a mail transmission section which receives the data output from the data processing section and sends an electronic mail containing the message to a communication terminal corresponding to the mail address.

BRIEF DESCRIPTION OF THE DRAWINGS

FIG. 4 is a table showing items to be set in the anomaly monitoring system;

DETAILED DESCRIPTION OF THE PREFERRED EMBODIMENT

Figure 1:
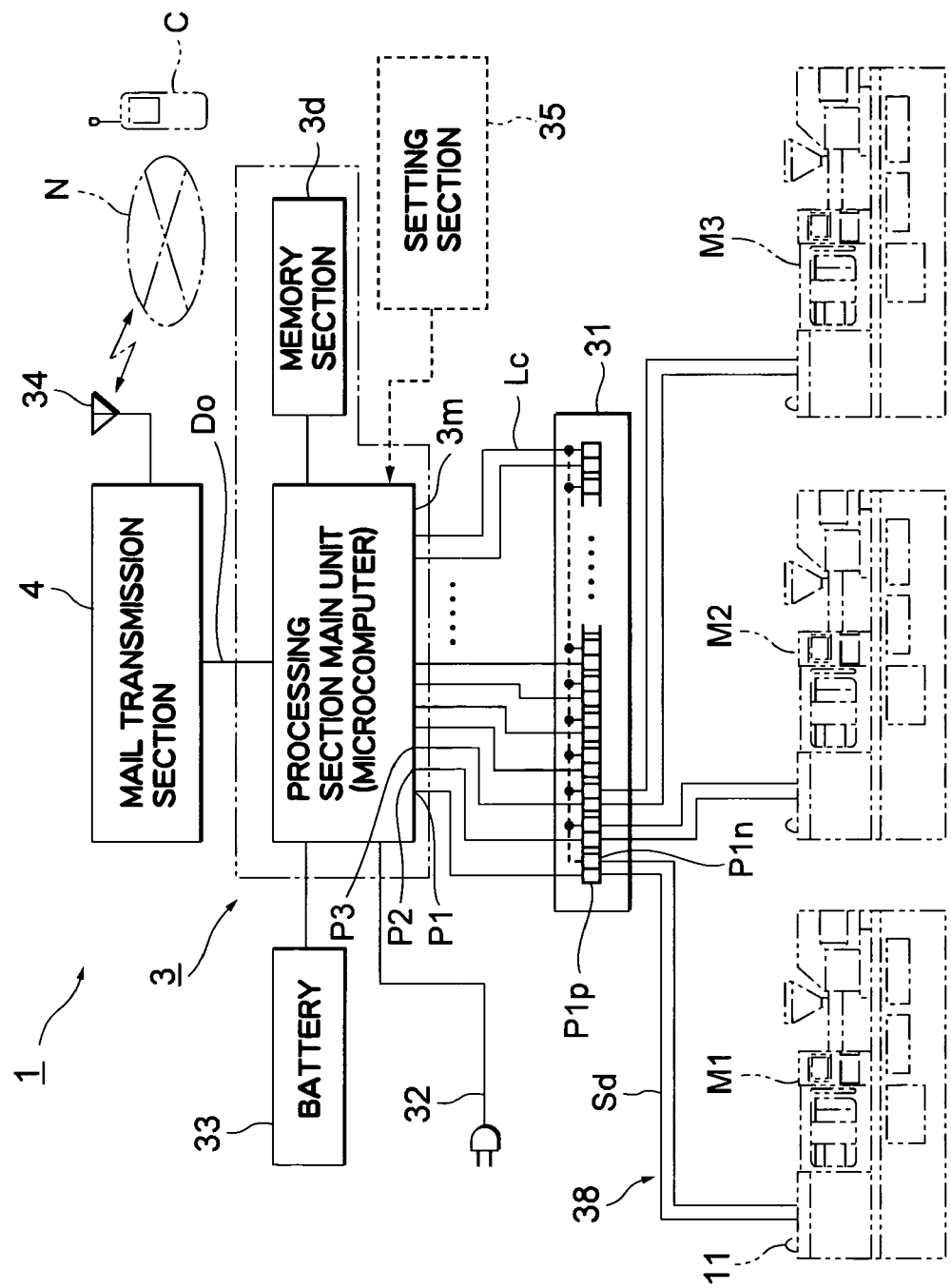
FIG. 1 is a block diagram of an anomaly monitoring system according to an embodiment of the present invention.

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of an anomaly monitoring system 1 for a molding machine according to the present embodiment will be described with reference to FIGS. 1 and 2.

In these drawings, M1, M2, and M3 represent injection molding machines to be monitored by the anomaly monitoring system 1 according to the present embodiment. As shown by an imaginary line in FIG. 2, the injection molding machine M1 includes a machine base M1*b*; and an injection unit M1*i* and a mold clamping unit M1*c*, which are disposed on the machine base M1*b*. The remaining injection molding machines M2, etc. are of the same configuration. The injection unit M1*i* includes a heating barrel 21; an unillustrated injection nozzle attached to the front end of the heating barrel 21; and a hopper 22 disposed on a rear portion of the heating barrel 21 and adapted to supply a material to the heating barrel 21. Meanwhile, the mold clamping unit M1*c* includes a mold 23 consisting of a movable mold half and a stationary mold half. A side panel 24 is provided in a standing condition on the machine base M1*b*, and includes a display 25 and an operation section 26, which are connected to a built-in molding machine controller.

As shown in FIG. 1, the anomaly monitoring system 1 of the present embodiment includes, as main components, a data processing section 3 and a mail transmission section 4 connected to the data processing section 3.

The data processing section 3 includes a processing section main unit 3*m*. This processing section main unit 3*m* can be constituted by a microcomputer or the like, because the processing section main unit 3*m* is required only to perform relatively simple data processing to be described later. The processing section main unit 3*m* has a plurality of (e.g., 32) input ports P1, P2, P3, etc. The number of ports may be freely increased. The data processing section 3 is provided with a connection terminal board 31 having connection terminals P1*p*, P1*n*, etc., which correspond in number to the input ports P1, etc. In this case, paired connection terminals P1*p*, etc. (positive side) and P1*n*, etc. (negative side) correspond to one input port P1, etc. Therefore, the positive side connection terminals P1*p*, etc. are connected to corresponding input ports P1, etc., and the negative side connection terminals P1*n*, etc. are connected together and are connected to a ground port of the processing section main unit 3*m* via a common line Lc.

Moreover, the data processing section 3 includes a memory section 3*d* in which at least messages Me1, Me2, etc. and mail addresses Ad1, Ad2, etc., which will be described later, are registered. Further, the processing section main unit 3*m* contains a DC power supply section. Reference numeral 32 denotes a power cord connected to the DC power supply section. The power cord 32 is connected to a commercial power source of AC 100 V. Reference numeral 33 denotes a battery for power failure. This battery 33 can be a small battery of a small capacity, because the battery 33 is required only to enable mailing of a message indicating occurrence of a power failure.

The mail transmission section 4 uses a terminal for packet communications. Therefore, the mail transmission section 4 has an antenna 34 and can be connected to a packet communication network N by means of radio. Therefore, the mail transmission section 4 can transmit an electronic mail, via the packet communication network N, to a communication terminal C such as a cellular phone, for which a predetermined mail address is set. Notably, reference numeral 35 denotes a setting section. This setting section 35 is used for performing various settings, including input of messages Me1, etc., which will be described later. The setting section 35 is connected to the processing section main unit 3*m* only when setting operation is performed. Therefore, upon completion of the setting operation, the setting section 35 is disconnected from the processing section main unit 3*m*. Although a personal computer or the like can be used as the setting section 35, if necessary, a dedicated setting unit may be used.

Next, the method of use and operation (function) of the anomaly monitoring system 1 of the present embodiment will be described with reference to FIGS. 1 to 6.

Figure 5:
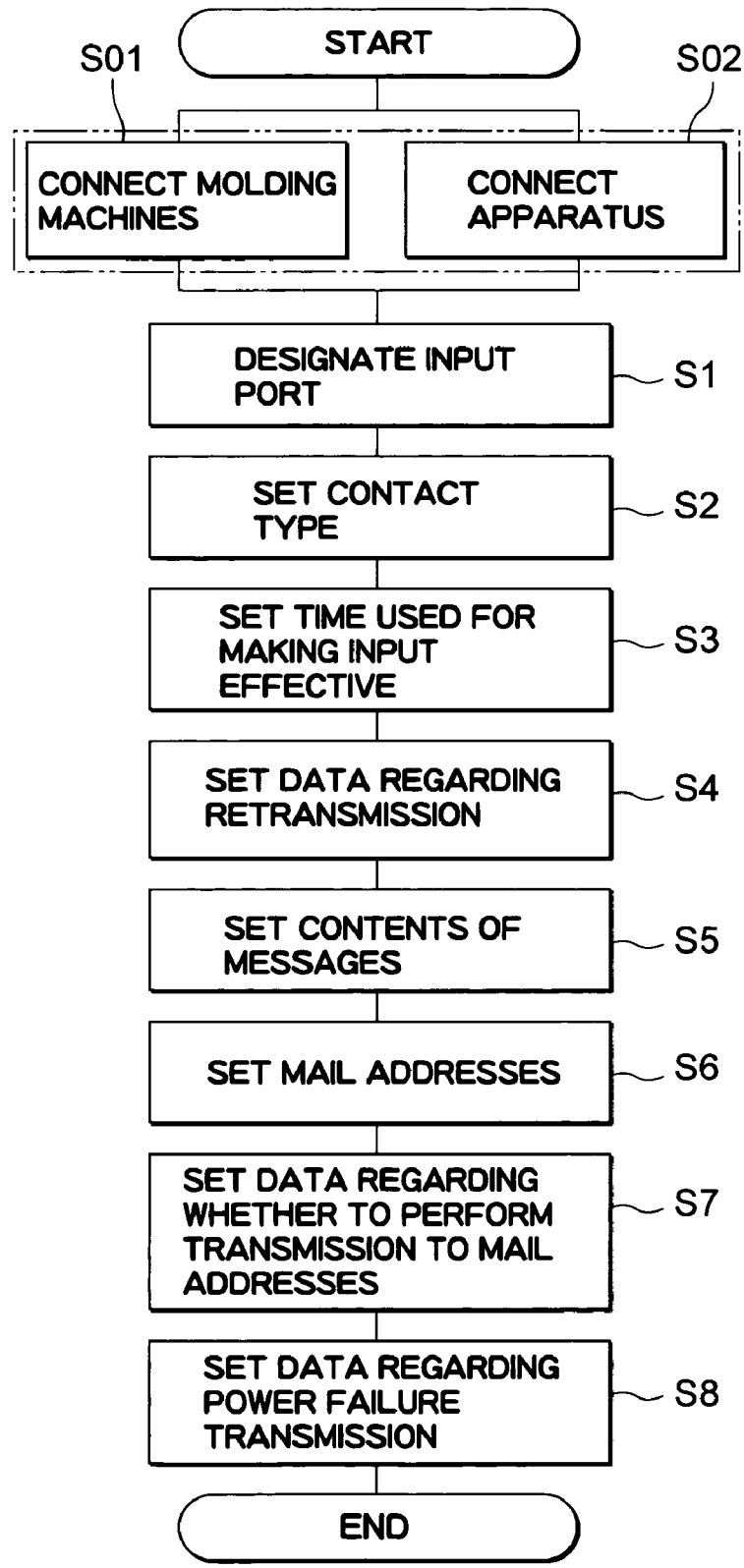
FIG. 5 is a flowchart showing a method of setting the individual items in the anomaly monitoring system.

First, a connection method (connection configuration) and setting method of the anomaly monitoring system 1 will be described in accordance with a flowchart shown in FIG. 5 and with reference to other drawings.

The anomaly monitoring system 1 can be disposed in a control room, or the like, located inside or near a plant in which the injection molding machines M1, etc. are installed. The respective injection molding machines M1, M2, M3, etc. are connected to the corresponding input portions P1, P2, P3, etc. of the data processing section 3; i.e., the corresponding connection terminals P1*p*, P1*n*, etc. of the connection terminal board 31 (step S01). As a result, the injection molding machine M1 is connected to the input port P1, the injection molding machine M2 is connected to the input port P2, the injection molding machine M3 is connected to the input port P3, and so on.

Figure 2:
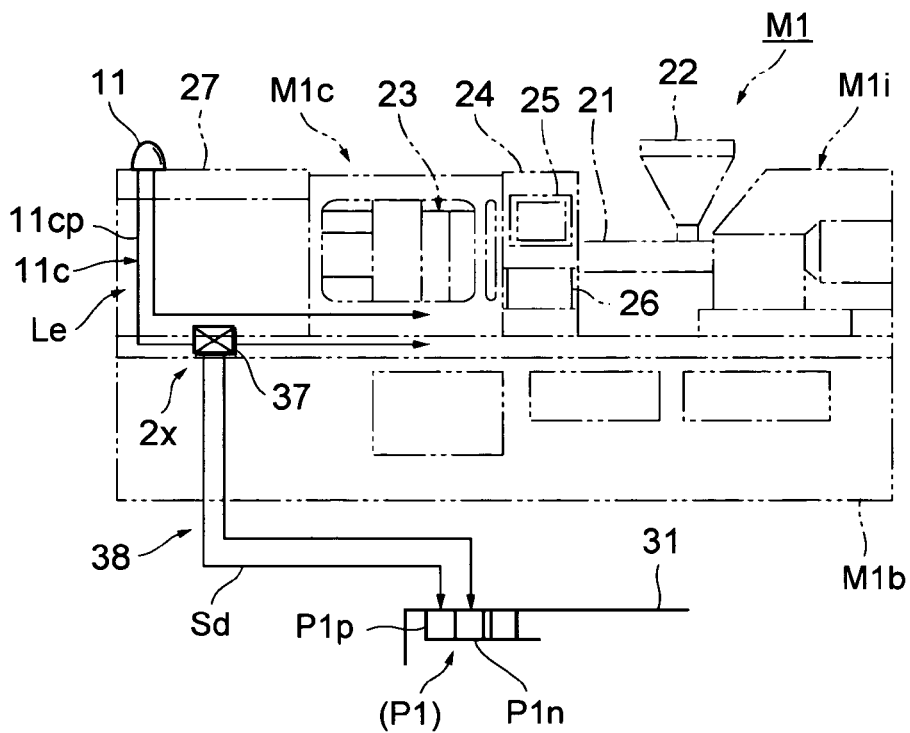
FIG. 2 is a circuit diagram showing one method of connection between the anomaly monitoring system and an injection molding machine.
Figure 3:
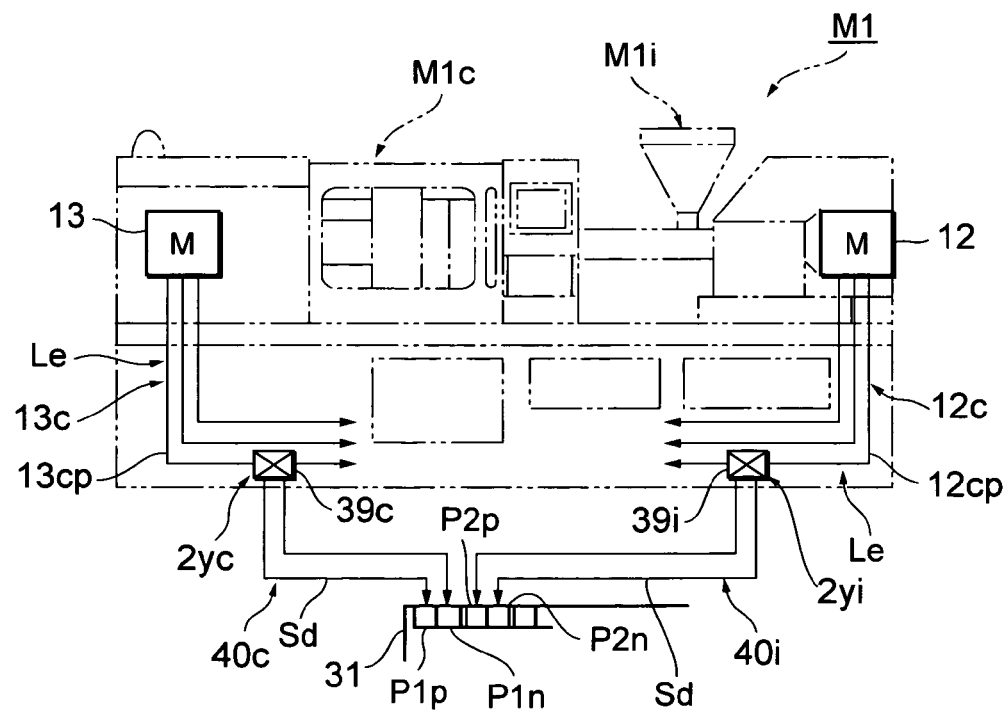
FIG. 3 is a circuit diagram showing another method of connection between the anomaly monitoring system and the injection molding machine.

The injection molding machine M1 is connected to the input port P1 as shown in FIG. 2. That is, a detection section 2*x* is connected to a conductive line Le of the injection molding machine M1, whose electrification state changes as a result of an anomalous stoppage of the injection molding machine M1, and detects the electrification state of the conductive line Le. The detection section 2*x* is connected to the input port P1. In this case, the conductive line Le is a connection cable 11*c* connected to an alarm lamp 11, which is provided on the injection molding machine M1 and which is turned on at the time of anomalous stoppage. The alarm lamp 11 is attached to an easy-to-see location on, for example, the upper end surface of a safety cover 27 of the injection molding machine M1. The alarm lamp 11 is connected to the above-mentioned mold machine controller via the connection cable 11*c*. When the injection molding machine M1 stops because of an anomaly, electricity is supplied to the alarm lamp 11 from the mold machine controller, whereby the alarm lamp 11 lights in red or yellow. Accordingly, use of the connection cable 11*c* connected to the alarm lamp 11 enables considerably easy attachment of the anomaly monitoring system to the existing injection molding machine M1.

The detection section 2*x* includes a relay 37. A relay coil of the relay 37 is connected to an intermediate portion of one wire 11*cp* of the connection cable 11*c*, and opposite ends of the relay switch are connected to the connection terminals P1p and P1n, respectively, via a connection cord 38. In this case, the relay switch of the relay 37 is of a A-contact type, so that the relay switch is opened (OFF) when the connection cable 11cp is not electrified, and is closed (ON) when the connection cable 11cp is electrified. Notably, the remaining injection molding machines M2, etc. are connected to the corresponding input ports P2, etc. in the same manner.

Incidentally, connection cables 12c and 13c connected to respective drive sections 12 and 13 of the injection unit M1i and the mold clamping unit M1c of the injection molding machine M1 may be used as the conductive line Le. The same applies to the remaining injection molding machines M2, etc. In general, the drive section 12 of the injection unit M1i includes a drive motor for rotating, or advancing and retreating, the screw within the heating barrel 21; and the drive section 13 of the mold clamping unit Mc includes a drive motor for advancing and retreating a movable platen supporting the mold 23 (movable mold). The respective drive sections (drive motors) 12 and 13 are connected to the above-mentioned mold machine controller via the connection cables 12c and 13c, respectively. Therefore, detection sections 2y1 and 2yc, which detect the state of electrification, are connected to wires 12cp and 13cp, respectively, of the connection cables 12c and 13c (step S02). As in the case of the above-described detection section 2x, relays 39i and 39c can be used as the detection sections 2y1 and 2yc. In the case where the connection cable wires 12cp and 13cp are not allowed to be cut, current transformers (current detection transformers) are coupled with the connection cable wires 12cp and 13cp, and the relays 39i and 39c are connected to the current transformers. Specifically, the relay coil of the relay 39i is connected to the corresponding current transformer; and opposite ends of the relay switch are connected to the connection terminals P2p and P2n, respectively, via a connection cord 40i. Similarly, the relay coil of the relay 39c is connected to the corresponding current transformer; and opposite ends of the relay switch are connected to the connection terminals P1p and P1n, respectively, via a connection cord 40c. In this case, the relay switch of the relay 39i (39c) is closed (ON) when the connection cable wire 12cp (13cp) is electrified (in a normal state), and is opened (OFF) when the connection cable wire 12cp (13cp) is not electrified (at the time of anomalous stoppage). There, "B-contact" is selected in a contact-type setting operation, which will be described later.

Meanwhile, various data are entered or set into the data processing section 3. FIG. 4 shows items for which data are entered. The data of the individual items are stored (registered) in the memory section 3d in a mutually related manner. The shown data are example data for the case where the relays 37 are connected to the connection cable wires 11cp of the alarm lamps 11 of the injection molding machines M1, etc., as shown in FIG. 2.

When data are to be entered or set for a certain injection molding machine; e.g., the injection molding machine M1, an operator first designates the corresponding input port P1 (step S1). Subsequently, the operator enters the contact type (step S2). FIG. 4 shows the case in which the A-contact is designated. Further, the operator enters a time which is used to enable (make effective) an ON signal from the A-contact-type relay switch only when the ON signal continues over that time (step S3). This time setting is performed so as to ignore an ON signal temporarily input because of disturbance or the like. Therefore, only when an ON signal continues over the entered time, the ON signal is fetched as a real ON signal; i.e., a detection signal Sd. Notably, when the state in which no electricity is supplied to the drive sections 12 and 13 is to be detected, in consideration of the operation interval in a single molding cycle, a time longer than the operation interval is entered. In this case, only when a signal indicative of an anomalous stoppage continues over the entered longer time, the signal is enabled. Furthermore, data indicating whether or not retransmission is necessary is entered (step S4). This data entry is performed in consideration of an oversight of a received electronic mail. The electronic mail is repeatedly sent at a set time interval.

Subsequently, the operator enters the contents of a message to be sent by means of an electronic mail (step S5). FIG. 4 shows the case where three messages Me1, Me2, and Me3 are entered for the time of anomalous stoppage (stoppage), the time of resumption (resumption), and the time of retransmission (retransmission), respectively. In this case, the contents of the message Me1 may be "Machine No. 1 has stopped." Subsequently, the operator enters mail addresses of recipients to which the electronic mail is to be sent (step S6). The number of recipients is arbitrarily determined. FIG. 4 shows the case where five mail addresses Ad1, Ad2, ..., Ad5 are entered. Further, for each of the mail addresses Ad1 to Ad5, data designating whether or not transmission is to be performed are entered for the time of anomalous stoppage (stoppage), the time of resumption (resumption), and the time of retransmission (retransmission), respectively (step S7). In the example shown in FIG. 4, transmission to the mail address Ad1 of a first supervisor is performed at all of the time of anomalous stoppage, the time of resumption, and the time of retransmission; transmission to the mail address Ad2 of a second supervisor is performed only at the time of anomalous stoppage and the time of retransmission; and transmission to the mail address Ad3 of a third supervisor is performed only at the time of anomalous stoppage and the time of resumption. Further, data regarding power failure transmission are entered (step S8). In this case, data indicating whether or not transmission is to be performed when power failure occurs, and a time for enabling detection of power failure are entered. Data entry (setting) regarding the input port P1 has been described. Data entry (setting) regarding other input ports P2, P3, etc. is performed in the same manner.

Figure 6:
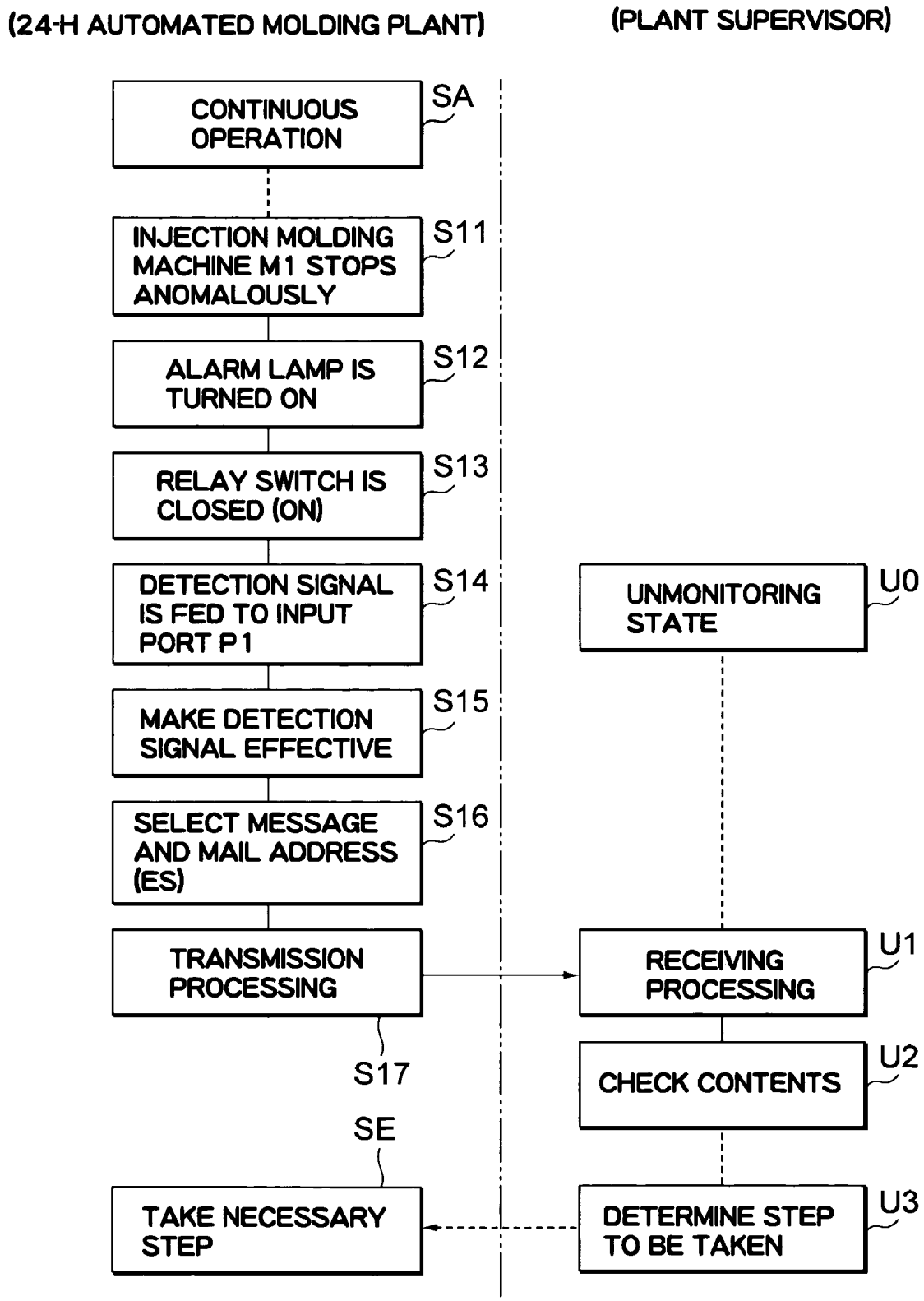
FIG. 6 is a flowchart showing operation of the anomaly monitoring system.

Next, operation of an automated molding plant which uses the anomaly monitoring system 1 of the present embodiment will be described with reference to a flowchart shown in FIG. 6.

Now, the automated molding plant is assumed to continuously operate 24 hours (step SA). Further, supervisors of the plant are assumed to be away from the plant and not to be able to directly monitor the plant (step U0). Further, it is assumed that in this state, an anomaly has occurred in a certain injection molding machine; i.e., the injection molding machine M1, and its operation has stopped (step S11). As a result, in the injection molding machine M1, the alarm lamp 11 is turned on (step S12). Accordingly, the connection cable wire 11cp is electrified, and the relay switch (A-contact) of the relay 37 is closed (ON) (step S13). As a result of the relay switch being closed, a detection signal Sd is fed to the input port P1 (step S14). Notably, during a period in which the injection molding machine M1 operates normally, the connection cable wire 11cp is in an unelectrified state, so that the relay switch is OFF, and the detection signal Sd is not generated.

Meanwhile, when the entered (set) time has elapsed after the detection signal was fed to the input port P1, the detection signal Sd becomes effective and is fetched (step S15). From the fact that the detection signal SD is fed to the input port P1, a determination is made that an anomaly has occurred in the injection molding machine M1. Therefore, in the processing section main unit 3m, as shown in FIG. 4, the message Me1 for the time of anomalous stoppage and the mail addresses Ad1 to Ad5 of the recipients are automatically selected on the basis of the detection signal Sd fed to the input port P1 (step S16). Subsequently, data Do representing the message Me1 and the mail addresses Ad1 to Ad5 of the recipients are sent from the data processing section 3 to the mail transmission section 4. Upon receipt of the data Do, the mail transmission section 4 establishes connection with the packet communication network N by means of radio, and transmits electronic mails (message Me1), via the packet communication network N, to communication terminals C, such as cellular phones, in which the mail addresses Ad1 to Ad5 are set, respectively (step S17).

Meanwhile, each relevant supervisor receives the transmitted electronic mail by means of his/her portable terminal C, such as a cellular phone (step U1). Thus, the supervisor can check the contents of the electronic mail; i.e., the contents of the message Me1 (step U2). In this case, the contents of the message Me1 are "Machine No. 1 has stopped," or the like. Therefore, from the production plane of the machine No. 1, the supervisor can determine how to cope with the anomalous stoppage (step U3). In particular, in the case where it becomes difficult to meet the date and/or time of delivery of the molded products under production, the supervisor his/herself can go to the plant so as to take a necessary step for resumption, or can contact another supervisor so as to cope with the anomalous stoppage when the supervisor his/herself cannot go to the plant (step SE). When a necessary step for resumption has successfully been taken for the injection molding machine M1 having anomalously stopped, the supply of electricity to the alarm lamp 11 is stopped, and thus the detection signal Sd disappears. As a result, the message Me2 for the time of resumption is transmitted to the set mail addresses Ad1, etc. by means of electrical mails. This transmission process is performed in the same manner as in the case of anomalous stoppage. Notably, in both the case of anomalous stoppage and the case of resumption, when retransmission is set, the message Me3 is repeatedly transmitted at the set intervals by means of electronic mails.

Therefore, the anomaly monitoring system 1 according to the present embodiment can achieve the major effect of enabling a supervisor to acquire information which specifies a molding machine M1, etc., having anomalously stopped, which is minimum necessary information that the supervisor wishes to acquire, at a remote location and by means of a communication terminal C such as a cellular phone. In addition, since the information specifying the injection molding machine M1, etc. can be easily acquired from the detection signals Sd each representing the state of electrification, and the input ports P1, etc. to which the detection signals Sd are fed, the system can be realized, by use of a considerably simple hardware configuration, at low cost and in a compact size. Moreover, since information specifying an anomalously-stopped injection molding machine M1, etc. can be easily acquired upon receipt of a detection signal Sd representing the state of electrification, it becomes unnecessary to mutually connect the communication section of a monitoring apparatus (monitoring system) and the communication section of each molding machine, and it also become unnecessary to perform monitoring by means of computer processing or active processing, unlike the case of the conventional monitoring apparatus (monitoring system). Through simplification of the control method, the system can be easily implemented at low cost from the viewpoint of software. Furthermore, the conductive line Le can be the connection cable 11c connected to the alarm lamp 11, which is provide on the injection molding machine M1, etc. and which is turned on at the time of anomalous stoppage, or the connection cables 12c and 13c connected to the respective drive sections 12 and 13 of the injection unit M1i and the mold clamping unit M1c of the injection molding machine M1, etc. Therefore, the anomaly monitoring system 1 of the present embodiment can be easily and reliably attached to an old-type injection molding machine or the like which does not have a communication section. Therefore, the anomaly monitoring system 1 of the present embodiment is excellent in terms of easiness of attachment and general application to various molding machines.

Figure 7:
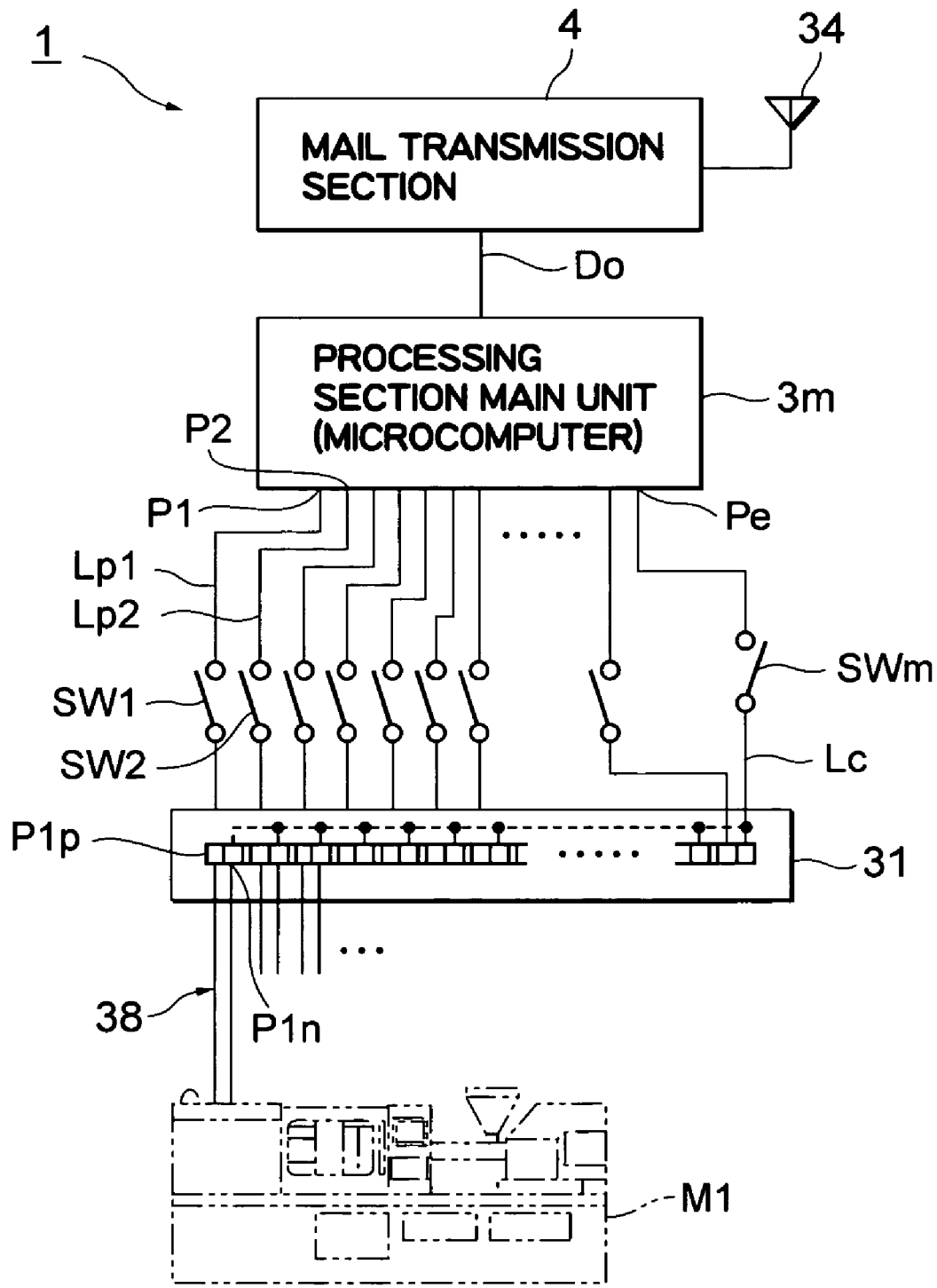
FIG. 7 is a block diagram of a portion of an anomaly monitoring system according to a modified embodiment of the present invention.

Next, an anomaly monitoring system 1 according to a modified embodiment of the present invention will be described with reference to FIG. 7.

In this modified embodiment, open-close switches SW1, SW2, etc. are connected in series in the connection lines Lp1, Lp2, etc., which connect the input ports P1, P2, etc. and the connection terminals P1p, etc. This configuration enables selection of an injection molding machine M1, etc. for which transmission of electronic mails is necessary, to thereby prevent problems; e.g., a problem such that all electronic mails including those that are not very important are transmitted, and communication cost increases. This function can be realized by means of a simple configuration; i.e., addition of the open-close switches SW1, SW2, etc. Moreover, ground lines connected to the detection sections 2x, 2yi, etc. are connected together and are connected to a ground port Pe of the data processing section 3 via a common line Lc. Therefore, an open-close switch SWm for enabling or disabling the entire transmission can be connected to the common line Lc. By virtue of this configuration, in the case where a supervisor works at the plant on a holiday or the like, the supervisor can completely stop transmission of electronic mails regarding the injection molding machine M1, etc. by turning off the open-close switch Swm, which serves as a master switch. This function can be realized by means of a simple configuration; i.e., addition of the single open-close switch SWm. Notably, the remaining configuration and operation of the modified embodiment are basically the same as those of the embodiment shown in FIG. 1. Therefore, components and sections identical with those of FIG. 1 are denoted by the same reference numerals and characters, and their detailed descriptions are not repeated.

While the present invention has been described with reference to the preferred embodiment, the present invention is not limited thereto. Regarding structural details, shapes, materials, methods, quantities, among others, modifications and any omission or addition may be possible as needed without departing from the scope of the invention. For example, the communication terminals C are not limited to the illustrated cellular phones, and a personal computer at home, a portable laptop personal computer, a mobile unit, etc. can be used as the communication terminals C. Further, in the above-described embodiments, the relays 37, etc. are used as the detection sections 2x, etc. However, any one of other detection means, including those that can be connected directly to the conductive line Le, etc., can be used, insofar as selected detection means can detect the state of electrification of the conductive line Le, etc. Moreover, although the injection molding machines M1, etc. are shown as example molding machines, the present invention can be similarly applied to molding machines of other types such as extrusion molding machines. The injection unit M1i and the mold clamping unit M1c are exemplified as units which constitute the molding machine M1, etc. and to which the present invention is applied. However, the units that constitute the molding machine M1 may be an ejector, a nozzle touch unit, or any other unit.

What is claimed is:

1. An anomaly monitoring system for a molding machine, which the system detects that at least a molding machine in continuous operation stops because of an anomaly and transmits a detection report to a conununication terminal at a remote location by means of communication means, the system comprising:
   at least one detection section which is provided in a conductive line of at least one molding machine, the state of electrification of the conductive line changing as a result of anomalous stoppage of the molding machine and the detection section detecting the electrification state of the conductive line;
   a data processing section having at least one input port to which the detection section is connected, wherein, when a detection signal indicating the electrification state of the conductive line is provided from the detection section, the data processing section outputs data regarding a mail address and a message prepared in accordance with the input port having received the detection signal and the electrification state; and
   a mail transmission section which receives the data output from the data processing section and sends an electronic mail containing the message to a communication terminal corresponding to the mail address,
   wherein the data processing section is configured to allow setting an arbitrary number of recipient mail addresses to which an electric mail is to be transmitted, and to allow individually setting, for each of the time of anomalous stoppage, the time of resumption, and the time of retransmission, data representing whether to transmit the electronic mail.

2. An anomaly monitoring system according to claim 1, wherein the conductive line is a connection cable connected to an alarm lamp which is provided on the molding machine and which is turned on at the time of anomalous stoppage.

3. An anomaly monitoring system according to claim 1, wherein the conductive line is a connection cable connected to one of drive sections of an injection unit and a mold clamping unit of the molding machine.

4. An anomaly monitoring system according to claim 1, wherein the detection section is a relay connected to the conductive line.

5. An anomaly monitoring system according to claim 1, wherein the detection section is a current transformer coupled to the conductive line.

6. An anomaly monitoring system according to claim 1, wherein the data processing section is configured to freely increase the number of input ports.

7. An anomaly monitoring system according to claim 1, wherein the data processing section is configured to allow setting of a time for making detection by the detection section effective.

8. An anomaly monitoring system according to claim 1, wherein the data processing section is configured to allow setting of data representing whether retransmission of a transmitted electronic mail is necessary.

9. An anomaly monitoring system according to claim 1, wherein the data processing section is configured to allow setting of three messages corresponding to the time of anomalous stoppage, the time of resumption, and the time of retransmission, respectively.

10. An anomaly monitoring system according to claim 1, wherein the data processing section is configured to allow setting of data in relation to power failure and to transmit, when a power failure occurs, an electronic mail containing a message indicative of occurrence of the power failure by use of a battery for power failure.

11. An anomaly monitoring system according to claim 1, wherein the mail transmission section uses a packet communication terminal.

12. An anomaly monitoring system according to claim 1, wherein the input port and the detection section are connected with each other via an open-close switch.

13. An anomaly monitoring system for a molding machine, which the system detects that at least a molding machine in continuous operation stops because of an anomaly and transmits a detection report to a communication terminal at a remote location by means of communication means, the system comprising:
   at least one detection section which is provided in a conductive line of at least one molding machine, the state of electrification of the conductive line changing as a result of anomalous stoppage of the molding machine and the detection section detecting the electrification state of the conductive line;
   a data processing section having at least one input port to which the detection section is connected, wherein, when a detection signal indicating the electrification slate of the conductive line is provided from the detection section, the data processing section outputs data regarding a mail address and a message prepared in accordance with the input port having received the detection signal and the electrification state; and
   a mail transmission section which receives the data output from the data processing section and sends an electronic mail containing the message to a communication terminal corresponding to the mail address,
   wherein the anomaly monitoring system includes a plurality of the detection sections; ground lines connected to the corresponding detection sections are connected together and are connected to a ground port of the data processing section via a common line; and an open-close switch is interposed in the common line.

14. An anomaly monitoring system according to claim 13, wherein the conductive line is a connection cable connected to an alarm lamp which is provided on the molding machine and which is turned on at the time of anomalous stoppage.

15. An anomaly monitoring system according to claim 13, wherein the conductive line is a connection cable connected to one of drive sections of an injection unit and a mold clamping unit of the molding machine.

16. An anomaly monitoring system, according to claim 13, wherein the detection section is a relay connected to the conductive line.

17. An anomaly monitoring system according to claim 13, wherein the detection section is a current transformer coupled to the conductive line.

18. An anomaly monitoring system according to claim 13, wherein the data processing section is configured to freely increase the number of input ports.

19. An anomaly monitoring system according to claim 13, wherein the data processing section is configured to allow setting of a time for making detection by the detection section effective.

20. An anomaly monitoring system according to claim 13, wherein the data processing section is configured to allow setting of data representing whether retransmission of a transmitted electronic mail is necessary.

* * * * *